July 24, 1962 F. C. WILLIAMS 3,046,471
POLYPHASE TRANSFORMER ARRANGEMENTS AND INDUCTION MACHINES
EMPLOYING POLYPHASE TRANSFORMER ARRANGEMENTS
Filed March 31, 1959 16 Sheets-Sheet 1
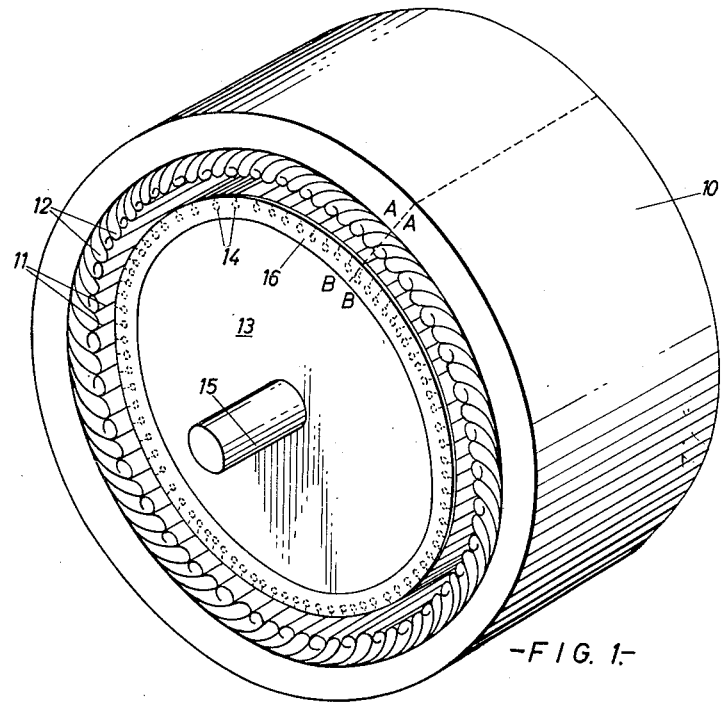
—FIG. 1.—
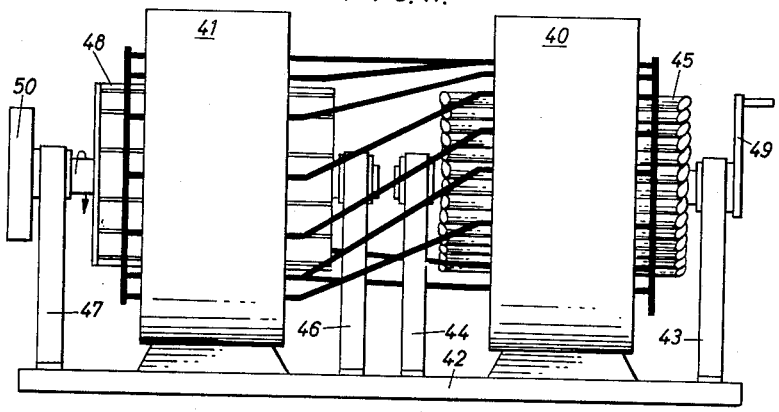
—FIG. 11.—
INVENTOR
FREDERIC CALLAND WILLIAMS
BY Stevens, Davis, Miller & Mosher
ATTORNEYS

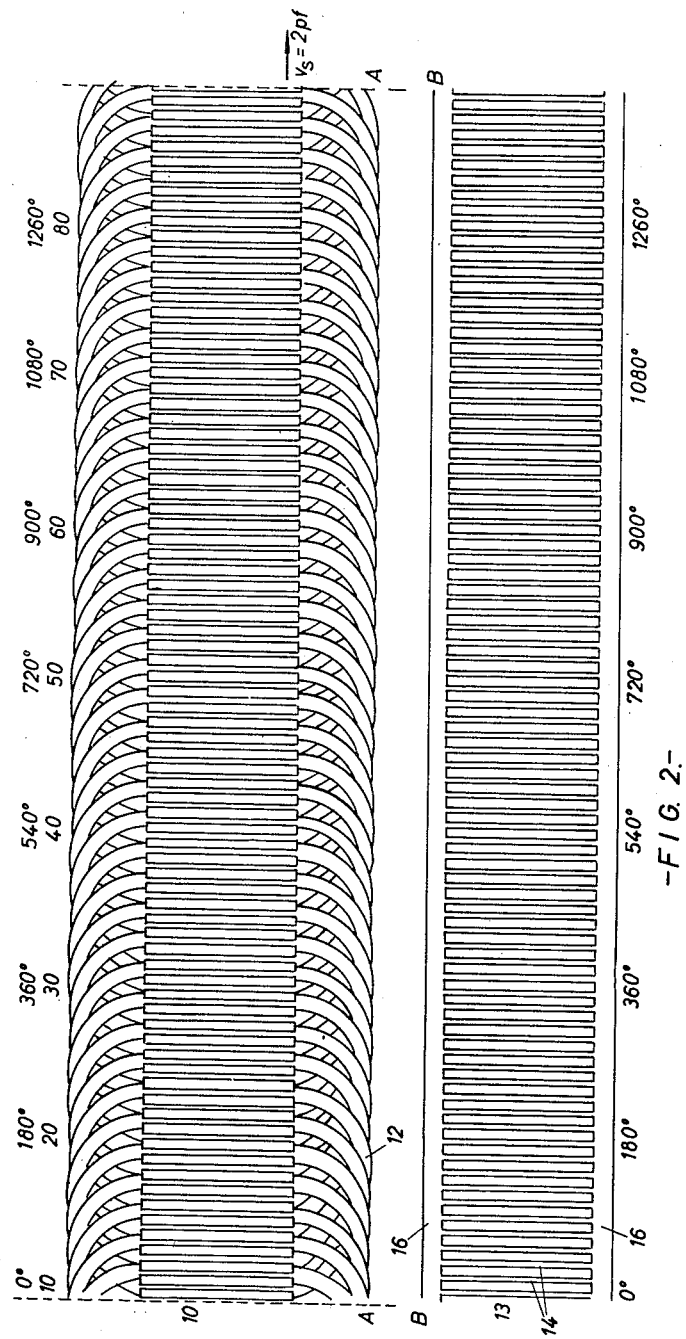

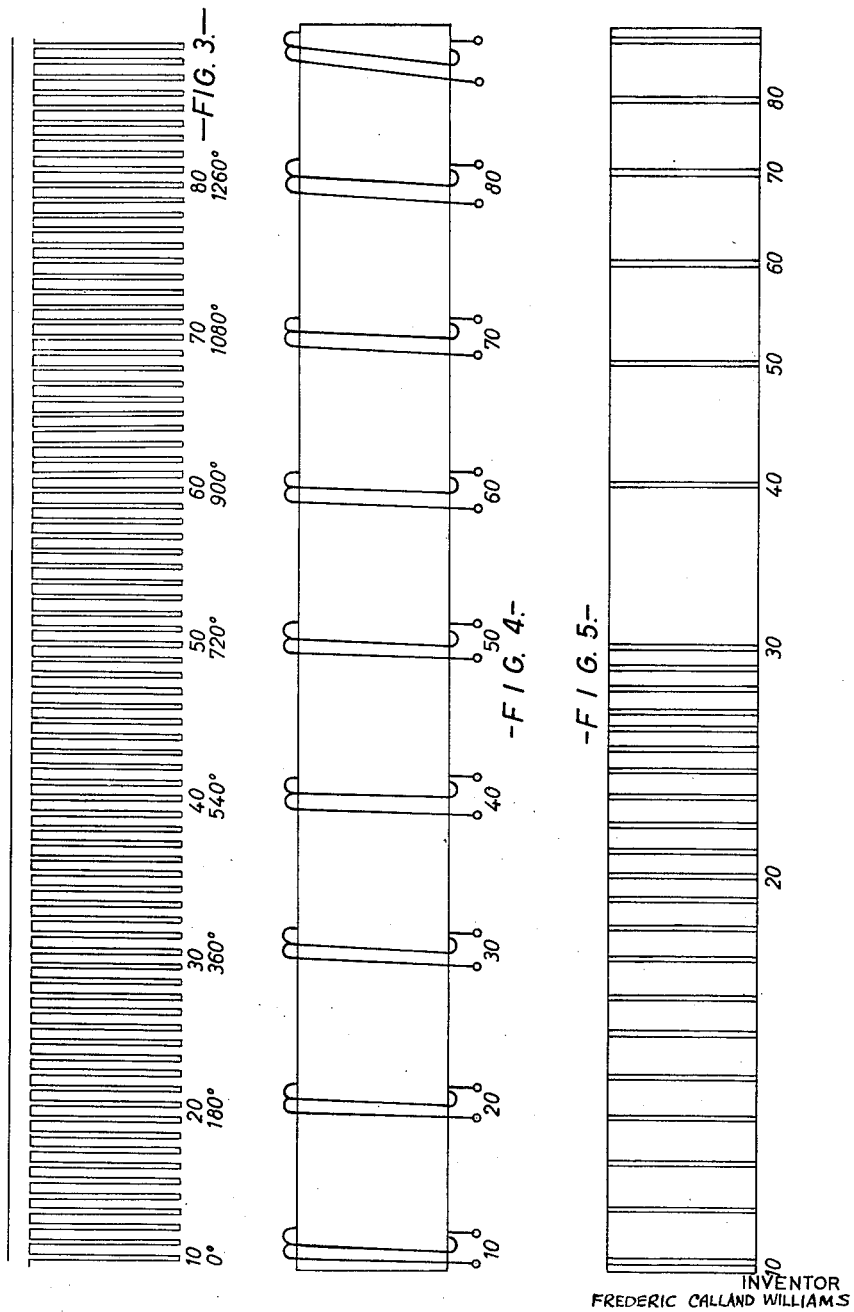

July 24, 1962 F. C. WILLIAMS 3,046,471
POLYPHASE TRANSFORMER ARRANGEMENTS AND INDUCTION MACHINES
EMPLOYING POLYPHASE TRANSFORMER ARRANGEMENTS
Filed March 31, 1959 16 Sheets-Sheet 4
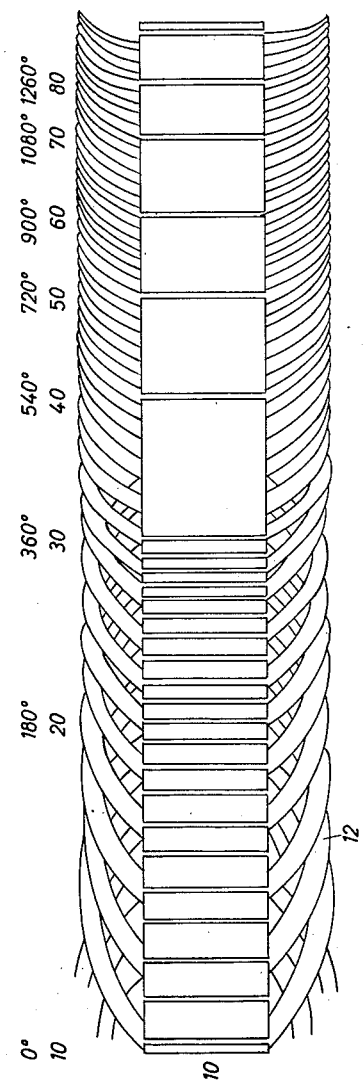
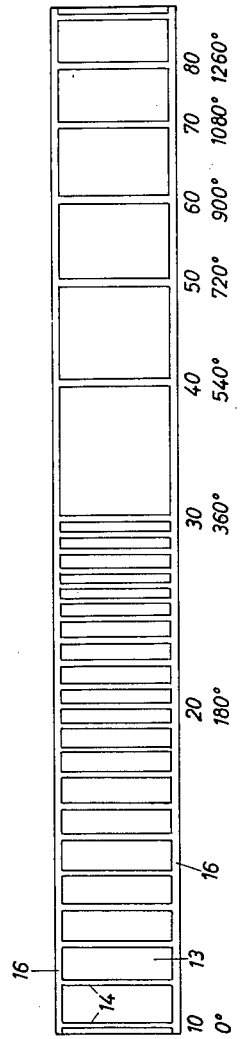
—FIG. 6.—
INVENTOR
FREDERIC CALLAND WILLIAMS
BY
Stevens, Davis, Miller & Mosher
ATTORNEYS

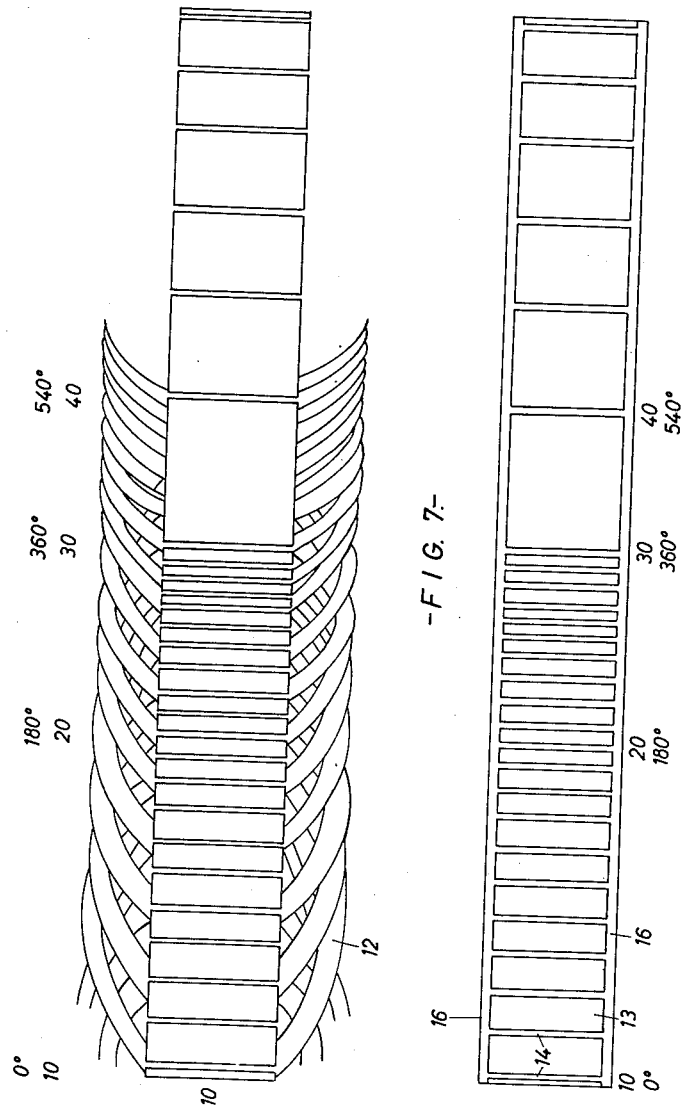

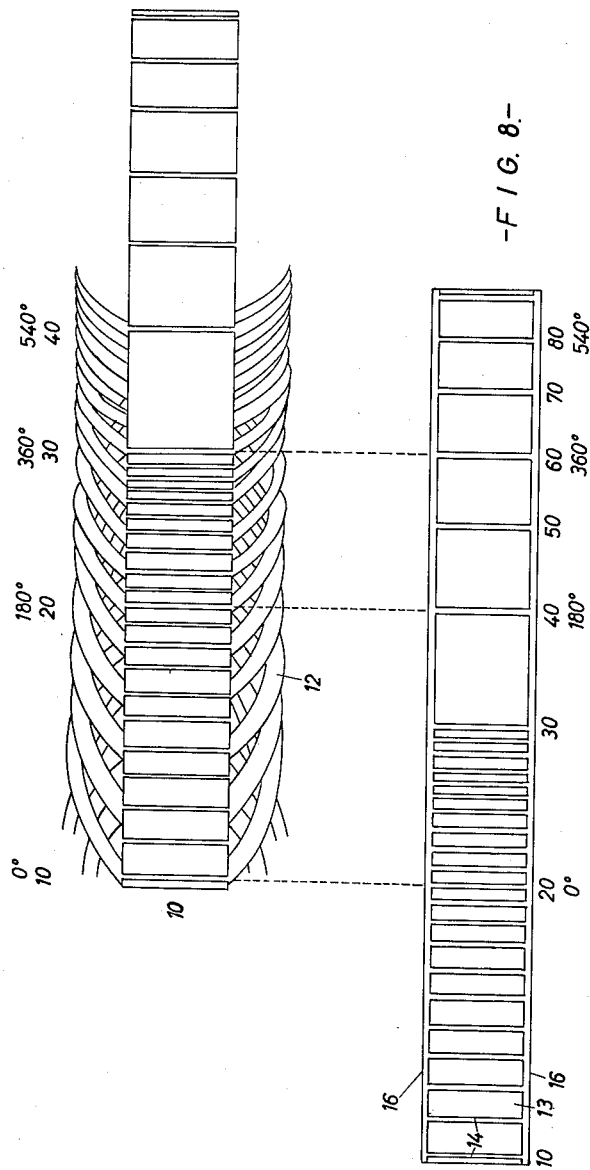

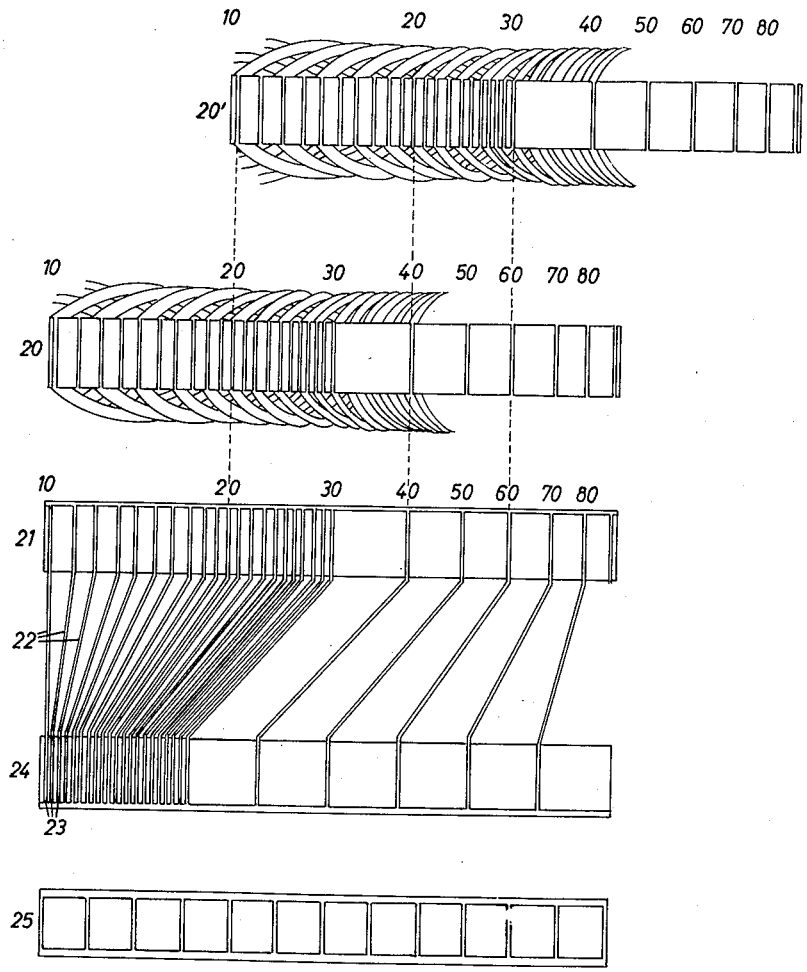
-FIG. 9.-

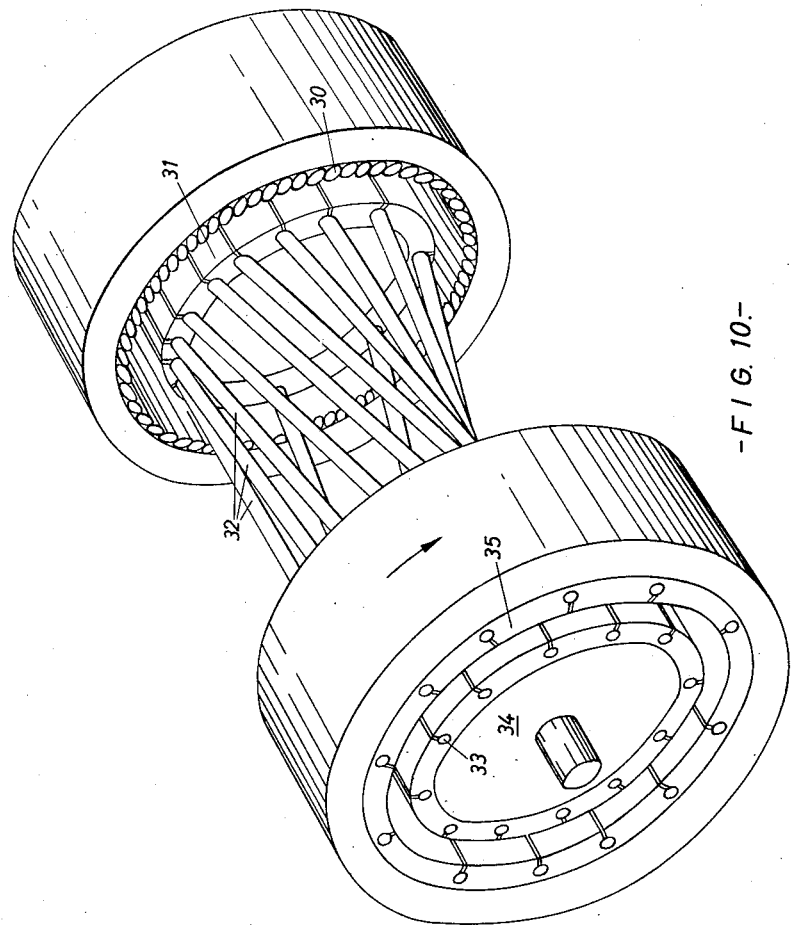

July 24, 1962 F. C. WILLIAMS 3,046,471
POLYPHASE TRANSFORMER ARRANGEMENTS AND INDUCTION MACHINES
EMPLOYING POLYPHASE TRANSFORMER ARRANGEMENTS
Filed March 31, 1959 16 Sheets-Sheet 9
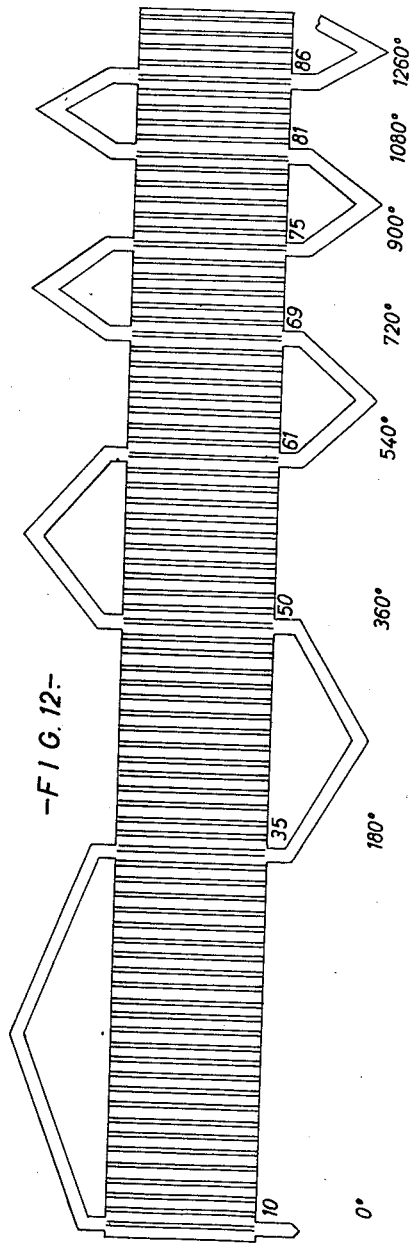
INVENTOR
FREDERIC CALLAND WILLIAMS
BY
Stevens, Davis, Miller+Mosher
ATTORNEYS

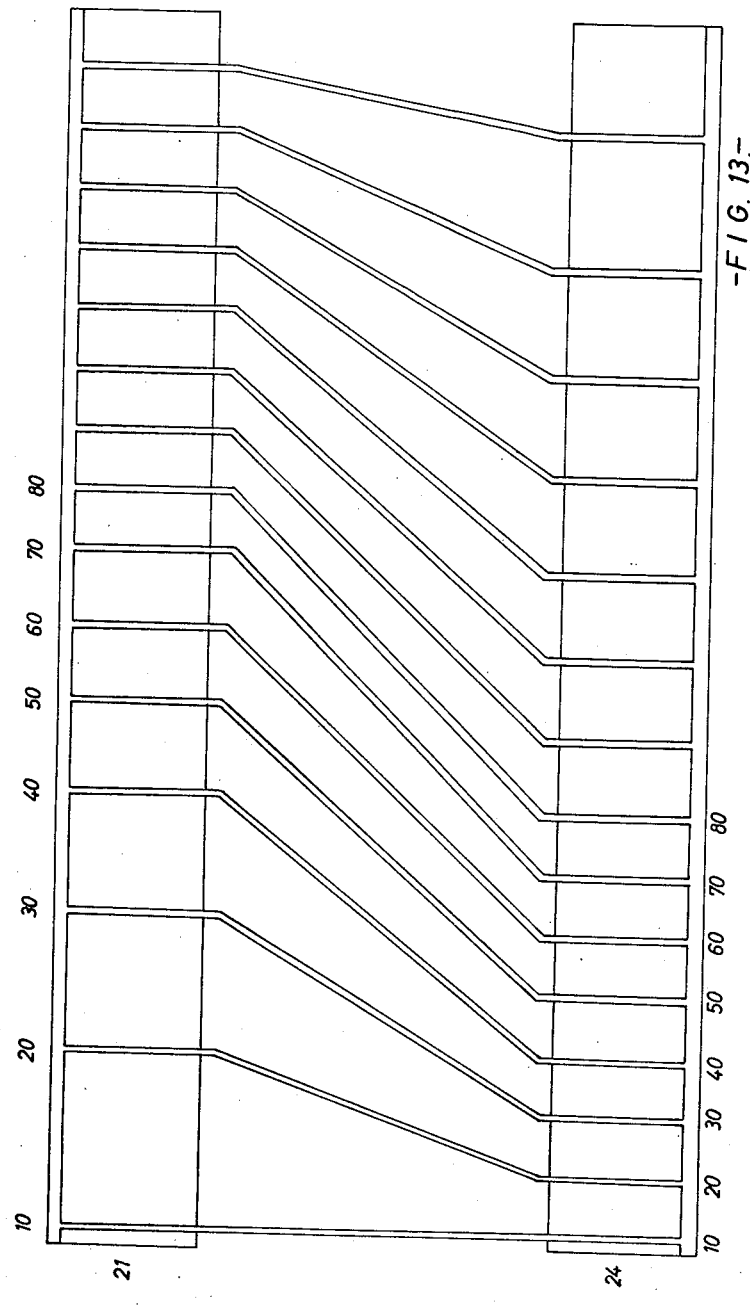

July 24, 1962 F. C. WILLIAMS 3,046,471
POLYPHASE TRANSFORMER ARRANGEMENTS AND INDUCTION MACHINES
EMPLOYING POLYPHASE TRANSFORMER ARRANGEMENTS
Filed March 31, 1959 16 Sheets-Sheet 11
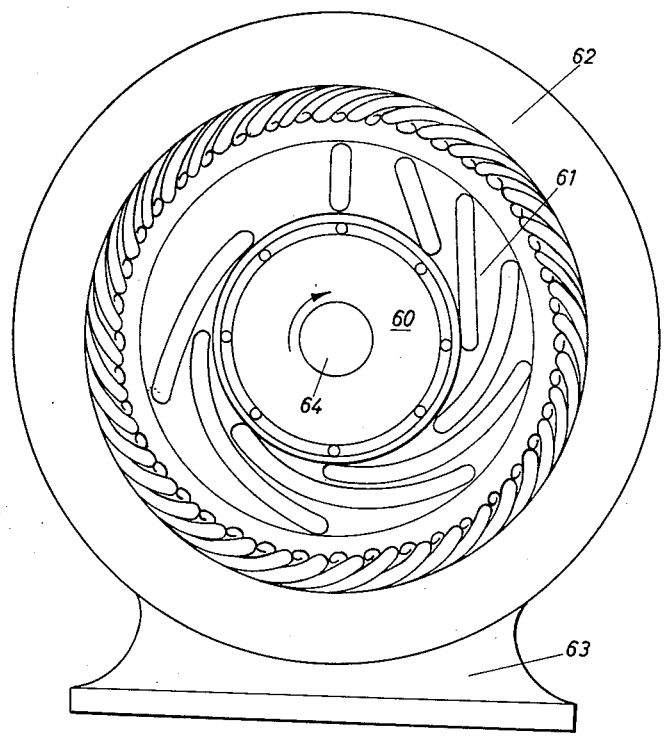
-FIG.14-
INVENTOR
FREDERIC CALLAND WILLIAMS
BY
Stevens, Davis, Miller & Mosher
ATTORNEYS

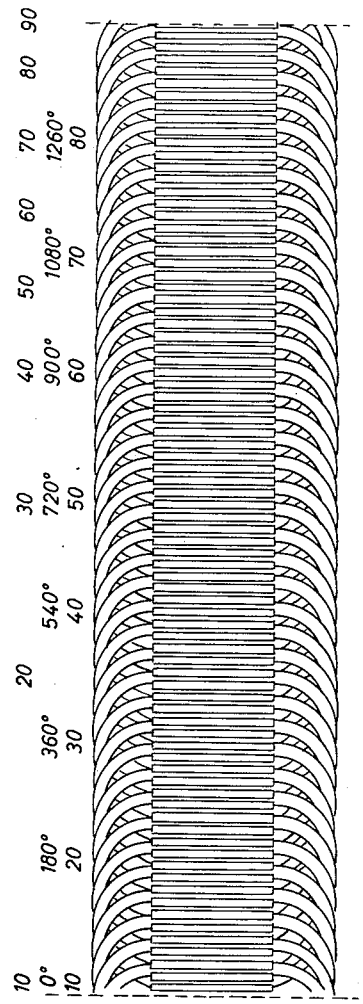
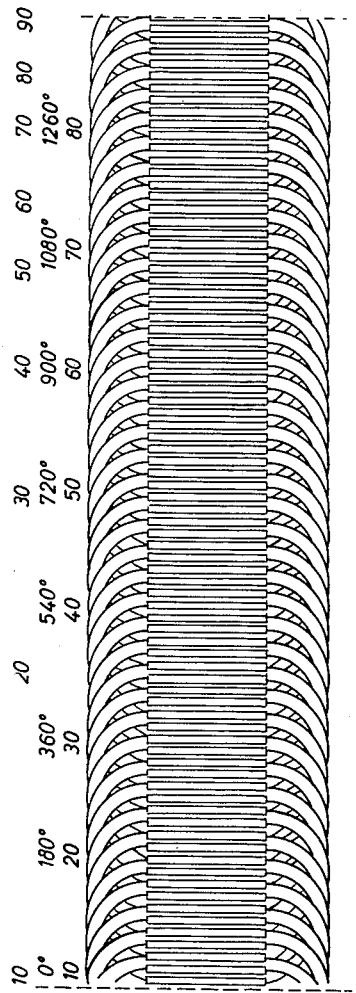
-FIG.15-

July 24, 1962   F. C. WILLIAMS   3,046,471
POLYPHASE TRANSFORMER ARRANGEMENTS AND INDUCTION MACHINES
EMPLOYING POLYPHASE TRANSFORMER ARRANGEMENTS
Filed March 31, 1959   16 Sheets-Sheet 13
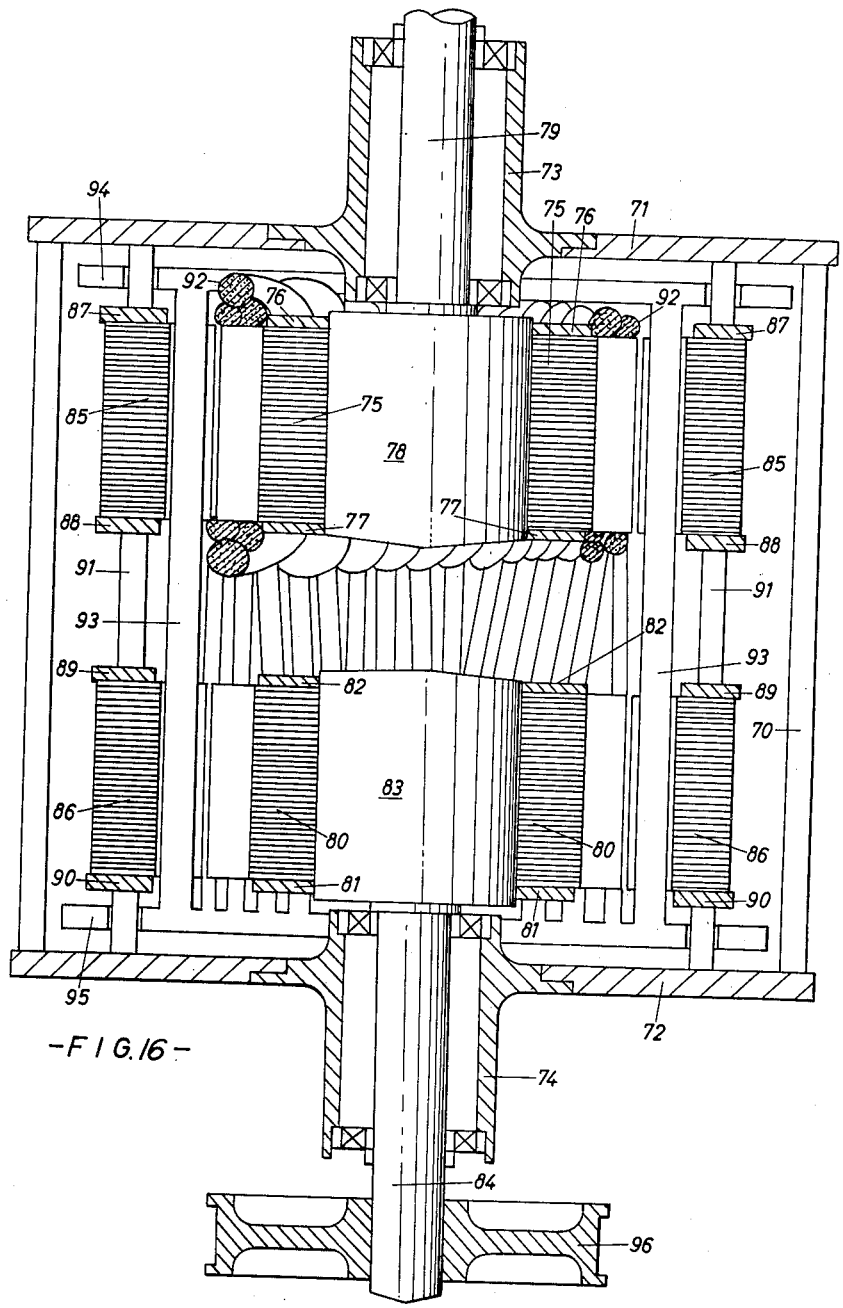
-FIG.16-
INVENTOR
FREDERIC CALLAND WILLIAMS
BY
Stevens, Davis, Miller & Mosher
ATTORNEYS

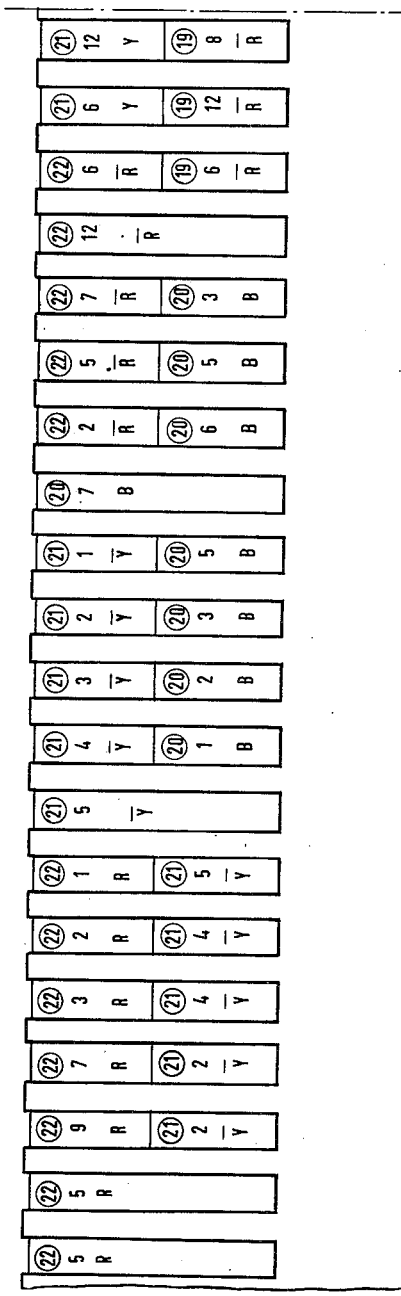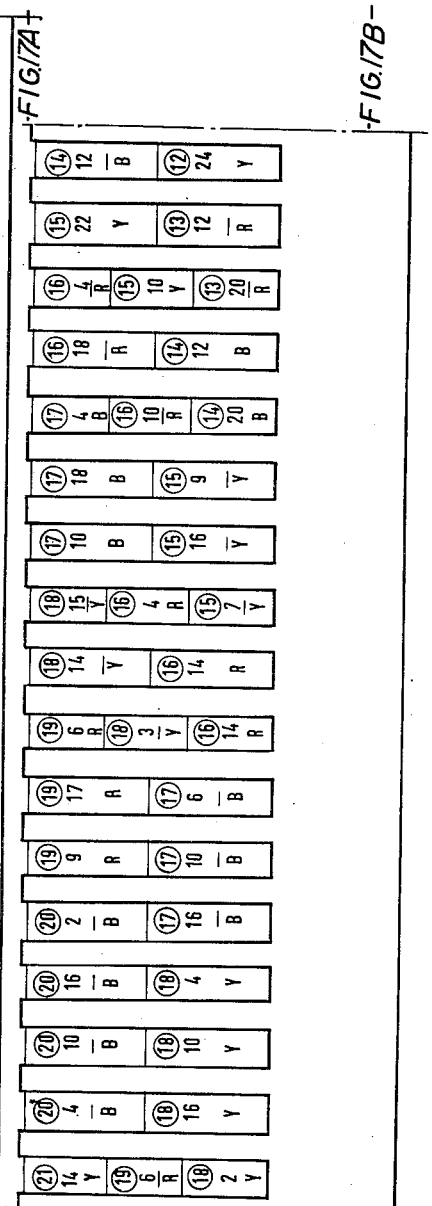

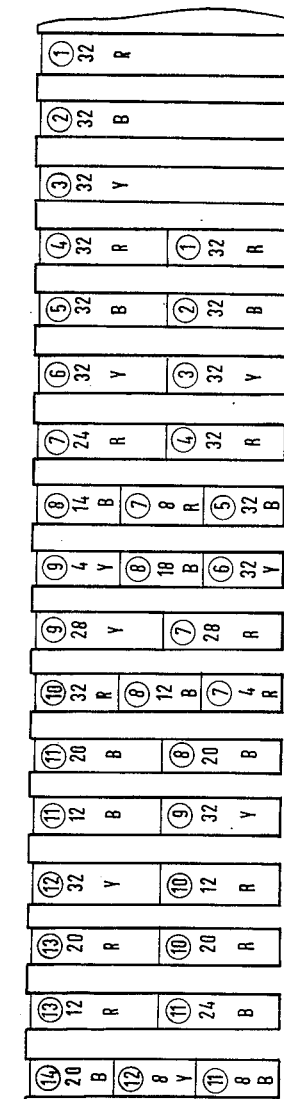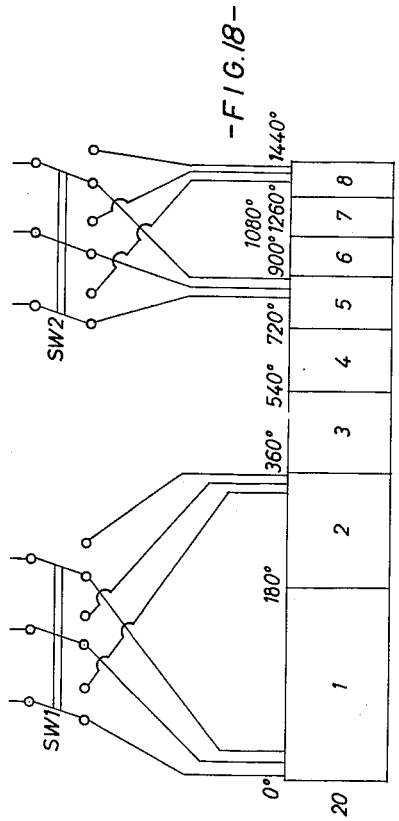

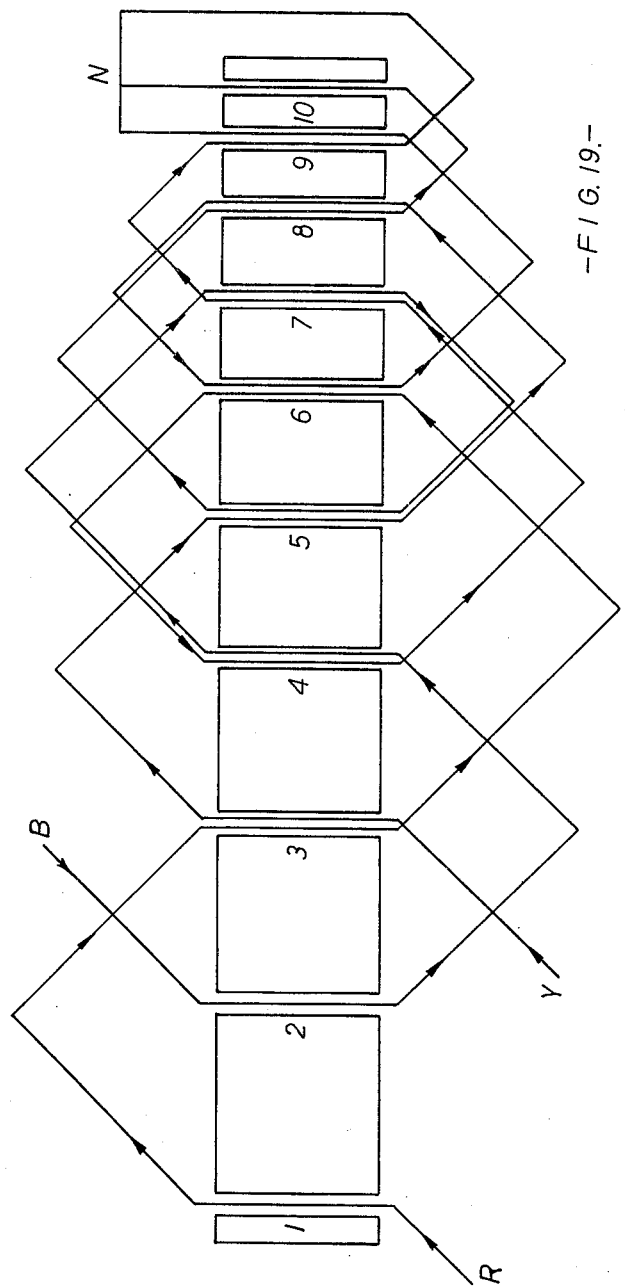
-FIG. 19.-

United States Patent Office 3,046,471
Patented July 24, 1962

3,046,471
POLYPHASE TRANSFORMER ARRANGEMENTS AND INDUCTION MACHINES EMPLOYING POLYPHASE TRANSFORMER ARRANGEMENTS
Frederic Calland Williams, Romily, England, assignor to National Research Development Corporation, London, England, a British corporation
Filed Mar. 31, 1959, Ser. No. 803,191
Claims priority, application Great Britain Apr. 8, 1958
6 Claims. (Cl. 323—52)

The present invention relates to polyphase transformer arrangements and to induction machines incorporating such transformer arrangements.

The main object of the invention is to provide a transformer arrangement which when energised from a polyphase supply will provide a plurality of phase outputs of which one or more characteristics are readily variable.

A further object of the invention is to provide an induction machine incorporating a phase transformer which enables a characteristic of the induction machine to be readily varied.

According to the invention, in a polyphase transformer arrangement, a primary winding adapted to be energised from a polyphase supply and a secondary winding, each accommodated on a slotted core, are arranged with the slots of both cores in substantially parallel relationship and one or more of the physical and/or electrical parameters of both the primary winding and one or more of the physical and/or electrical parameters of the secondary winding varies as a logarithmic function of one of the other parameters in passing along the cores, means being provided for enabling relative movement to take place between the primary and secondary windings in a direction substantially transverse to the slots in the cores to enable a multiphase output to be obtained such that the amplitude of each phase output or the phase difference between adjacent phase output terminals or both simultaneously is capable of adjustment by relative movement between the primary and secondary windings.

According to one aspect of the invention, in a polyphase transformer arrangement, a polyphase primary winding is accommodated in a uniformly slotted structure and is so arranged that the effective phase of the total current in the conductors of a slot is a logarithmic function of the slot number and a secondary winding also accommodated in a uniformly slotted structure comprises either one bar in each slot or one ring wound coil in each slot, said bars or windings being interconnected to provide a multiphase output in which the phase difference between adjacent phase output terminals is capable of variation from one pair of adjacent phase output terminals to another but in which all such phase differences between adjacent phase output terminals are adjustable in the same ratio by moving one of said structures relative to the other in a direction substantially transverse to the direction of the slots.

According to another aspect of the invention, a polyphase transformer arrangement comprises a primary winding energised from a polyphase supply and accommodated on a slotted core, the winding being arranged in such a manner that the phase of the effective current flowing in the conductors of any slot is a logarithmic function of the distance of that slot from a first slot, a secondary winding which is also accommodated on a slotted core and is coupled to the primary winding, the secondary winding being connected to a third winding also accommodated on a slotted core and the connection between the secondary winding and said third winding is such that the phase of the effective current which flows in the conductors of any slot of the core accommodating said third winding is proportional to the distance of that slot from a first slot and means for adjusting the relative position between the primary and secondary windings to enable the constant of proportionality to be altered.

According to a further aspect of the invention, an induction machine comprises a primary winding energised from a polyphase supply and accommodated on a slotted core, the winding being arranged in such a manner that the phase of the effective current flowing in the conductors in any slot is a logarithmic function of the distance of that slot from a first slot, a secondary winding which is also accommodated on a slotted core and is coupled to the primary winding, the secondary winding being connected to a third winding forming the energising stator of the machine and also accommodated on a slotted core and the connection between said secondary winding and said third winding is such that the phase of the effective current which flows in the conductors of any slot of the core accommodating said third winding is proportional to the distance of that slot from a first slot, a rotor coupled to said third winding and means for adjusting the relative position between the primary and secondary windings to enable the constant of proportionality to be altered.

According to yet another aspect of the invention, an induction machine comprises a plurality of bars of conducting material arranged in slots in a first slotted structure, a second structure containing a squirrel cage winding and a phase transformer arrangement energised from a source of polyphase supply and providing a plurality of outputs greater than the number of phases in said supply, the phase difference between adjacent outputs being capable of variation and the outputs being connected to corresponding bars of said first slotted structure whereby the first slotted structure generates a moving magnetic field which causes movement of said second structure, the speed of movement of said moving magnetic field and hence the speed of movement of said second structure being capable of variation in accordance with variation in phase difference between adjacent outputs of said phase transformer arrangement.

According to a still further aspect of the invention, in an induction machine comprising a phase transformer arrangement and an induction motor, the transformer arrangement consists of a primary winding adapted to be energised from a polyphase supply and wound in slots provided in a first core structure in such a manner as to produce currents in the conductors of the slots such that the total current in the conductors of each slot is a logarithmic function of the slot number, a secondary winding comprising bars or ring-wound coils interconnected to produce a multiphase output supply, means for effecting relative movement between said primary and said secondary windings in a direction substantially transverse to the slots and in which the induction motor comprises a stationary member consisting of bars of conducting material short-circuited at one end and arranged in slots in a third core structure, the bars of said secondary winding being interconnected with corresponding bars of said stationary member and a movable member consisting of bars of conducting material short-circuited at both ends and arranged in slots in a fourth core structure, whereby when the primary winding is energised from the polyphase supply, the currents induced in the bars of said secondary winding exhibit an equal phase difference between adjacent slots, the phase difference being variable on relative movement between said primary and said secondary windings to enable the pole-pitch of the magnetic field set up by said stationary member and causing movement of said movable member to be varied thereby varying the speed of movement of said moving member.

According to a further aspect of the invention, in an induction machine comprising a phase transformer arrangement and an induction motor, the transformer arrangement consists of a primary winding adapted to be energised from a polyphase supply and wound in slots provided in a first core structure, a secondary winding consisting of bars of conducting material short-circuited at one end and arranged in slots in a second core structure, the slots in the two core structures being arranged in parallel relationship while the spacing between the slots of the first core structure and between the slots of the second core structure varies as a logarithmic function of the slot number and means for effecting relative movement between said primary and said secondary windings in a direction transverse to the slots and in which the induction motor comprises a stationary member consisting of bars of conducting material short-circuited at one end and arranged in slots in a third core structure, the bars of said secondary winding being interconnected with corresponding bars of said stationary member and a movable member consisting of bars of conducting material short-circuited at both ends and arranged in slots in a fourth core structure, whereby when the primary winding is energised from the polyphase supply, the currents induced in the bars of said secondary winding exhibit an equal phase difference between adjacent slots, the phase difference being variable on relative movement between said primary and said secondary windings to enable the pole-pitch of the magnetic field set up by said stationary member and causing movement of said movable member to be varied thereby varying the speed of movement of said moving member.

The invention will be better understood from the following description of a number of embodiments taken in conjunction with the accompanying drawings comprising FIGS. 1 to 23. In the drawings, FIG. 1 shows somewhat diagrammatically a squirrel cage induction motor of conventional type, FIG. 2 shows the stator and rotor windings when opened out, FIG. 3 shows another form of rotor winding, FIG. 4 shows a further form of rotor winding, FIG. 5 shows the non-uniform arrangement of the slots in the transformer primary or secondary winding core according to the invention, FIG. 6 shows the primary and secondary windings of the transformer arrangement according to the invention, FIG. 7 shows an alternative to the arrangement of FIG. 6, FIG. 8 illustrates the variable effect obtainable with the transformer arrangement according to the invention, FIG. 9 shows the arrangement of the windings of an induction machine according to the invention, FIG. 10 shows diagrammatically one form of an induction machine according to the invention, FIG. 11 shows diagrammatically an alternative form of induction machine according to the invention, FIG. 12 shows an alternative form for the primary winding of the transformer arrangement.

FIG. 13 shows an alternative arrangement of the secondary winding of the transformer arrangement and the stationary structure of the induction machine, FIG. 14 shows diagrammatically a further form of an induction machine according to the invention, FIG. 15 shows a further arrangement of the primary and secondary windings of the transformer arrangement, FIG. 16 shows a cross-sectional view of a constructional form of an induction machine according to the invention, FIG. 17A, B and C show a practical winding plan for the primary winding of the transformer arrangement, FIG. 18 shows a switching arrangement for rendering effective different sections of the transformer primary winding, and FIG. 19 shows the manner in which the three phases of the supply are connected to the coils forming the primary winding of the transformer arrangement.

It should be explained that the same parts are shown in many of the drawings and where this occurs, the parts are given the same reference in the different drawings.

The invention will be best understood by considering the principles of operation of a squirrel cage induction motor of the type shown in FIG. 1. In this drawing, the stator 10 of the machine is provided with a plurality of slots 11 for the reception of coils 12. The rotor 13 is also provided with slots each of which houses a single bar 14 of conducting material. The bars are joined together at the two ends by the provision of end rings also of conducting material, one of the end rings being shown at 16. The rotor is of course mounted for rotation on a shaft 15. As is well known the stator winding when energised from a polyphase source of supply gives rise to a rotating magnetic field which causes current to flow in the rotor bars thereby giving rise to a second magnetic field which interacts with the first field to cause the rotation of the rotor.

If the motor shown in FIG. 1 is cut along the dotted line and opened out flat and if, in addition, the rotor and stator are opened bookwise, the appearance of the two parts will be as shown in FIGS. 2A and 2B respectively where the letters A and B correspond to the same letters shown in FIG. 1. In this developed form, the stator winding produces a magnetic field travelling with velocity $v_s$ equal to $2pf$, where $p$ is the pole pitch of the winding and $f$ the frequency of the supply. In the ideal case the energisation of the stator winding will produce alternating currents in the conductors in the slots, the phase of the currents advancing progressively from left to right. The phase difference between currents in any pair of adjacent slots is the same and equal to $$\frac{180n}{N}$$

degrees, where $n$ is number of poles and N is the number of slots. This is indicated in FIGS. 2A and 2B for the case of an 8 pole structure having 80 slots, the phases being indicated for every tenth slot, relative to the phase at the left hand edge. The slots are numbered from 10 to 89, and it will be seen that the advance in phase from one slot to the next will be $$\frac{180 \times 8}{80} = 18 \text{ degrees}$$

That is to say if the phase of the currents flowing in the conductors of the first slot i.e. that numbered 10, is 0 degrees, the phase of the currents in the second slot will be 18 degrees, that in the third will be 36 degrees, that in the fourth will be 54 degrees and so on. The phase of the current flowing in the conductors of a slot is thus directly proportional to the distance of that slot from the first slot. The rotor squirrel cage is tightly coupled to this winding and its bars will carry a current directed in opposition to the element of stator current that they face. With the rotor stationary only very small differences between stator and rotor currents will be required to produce the magnetic field and these differences can be neglected in the first instance. Thus the phases of the rotor bar currents will be very nearly a copy of the stator phases as indicated.

FIG. 3 shows a similar arrangement of the rotor to that shown in FIG. 2, except that one end ring of the rotor winding has been removed. Currents cannot now flow in the rotor but the rotor bars will exhibit E.M.F.'s whose phase increases progressively from left to right relative to the left hand edge as indicated in the drawing.

FIG. 4 shows a further alternative for the rotor structure in which the rotor bars have been replaced by ring wound coils surrounding the rotor iron, every tenth coil only being shown. The E.M.F.'s across the ends of these coils will again show a progressive change of phase from left to right.

It will be understood that the stator and the rotor may be regarded as the primary and secondary respectively of a transforming arrangement and that if one of the end rings of the rotor is removed and external connections are made to the rotor bars or to the ring wound coils in the case of FIG. 4, current will flow in the external circuits when the stator winding is energised, the stator and rotor being maintained at rest. In view of this the terms stator and rotor will not be used in the subsequent description but the terms transformer primary and transformer secondary respectively will be adopted instead.

The above discussion has been concerned with the case where the slots in the transformer primary and the bars in or the ring wound coils on the transformer secondary are uniformly spaced.

It will now be assumed that the slots in the primary and secondary windings are arranged, as shown in FIG. 5 in a non-linear manner such that the displacement of a slot from the left-hand edge of the winding is proportional to $$\log \frac{x}{10}$$

where $x$ is the slot number counted from the left-hand edge of the winding. The displacement between the slots now decreases in passing from the left-hand edge towards the right-hand edge and the displacements are in fact in accordance with the markings on the bottom scale of a slide rule.

The total number of slots in the primary and secondary windings is again taken to be 80, numbered from 10 to 89 as in FIG. 2. The primary winding is wound in exactly the same manner as that shown in FIG. 2 and the secondary winding again consists of a set of bars, one for each slot as shown in FIGS. 2 or 3. If the primary and secondary windings are arranged so that correspondingly numbered slots are in alignment, the result will be as shown in FIG. 6. If now the two structures carrying the primary and secondary windings are coupled together by "closing the book," individual bars of the secondary winding will face the same currents in the slots of the primary winding as they did in FIG. 2. The phase of the currents carried by the bars is therefore the same as it was in FIG. 2, that is assuming the phase of the current in the first bar to be zero, the phase of the currents in the second bar is 18 degrees, in the third bar 36 degrees, in the fourth bar 54 degrees and so on, the phase increment being 18 degrees.

Now suppose the relative positions of the transformer primary and secondary is changed to that shown in FIG. 8. Slots 10 to 20 of the transformer primary, which cover a phase interval of 180 degrees are now opposite slots 20 to 40 of the transformer secondary and slots 20 to 30 of the transformer primary which also cover a phase-interval of 180 degrees are opposite slots 40 to 60 of the transformer secondary and so on. Thus while slot No. 10 of the transformer primary is opposite to slot No. 20 of the transformer secondary, slot No. 11 of the transformer primary is opposite to slot No. 22 of the transformer secondary. Similarly slot No. 12 of the transformer primary is opposite to slot No. 24 of the transformer secondary and so on. Now the phase increment between the currents in adjacent slots of the transformer primary is still 18 degrees and hence the phase increment between the currents in the bars 20 and 22 and between bars 22 and 24 of the transformer secondary is also 18 degrees. As far as bars 21 and 23 are concerned, these are approximately mid-way between bars 20 and 22 and between bars 22 and 24 respectively so that the phase increment between the currents in bars 20 and 21, between the currents in bars 21 and 22, between the currents in bars 22 and 23 and between the currents in bars 23 and 24 is to a close approximation 9 degrees. Thus the phase increment between adjacent bars of the transformer secondary has been changed from 18 degrees to 9 degrees by altering the relative position of the transformer primary with respect to the transformer secondary from that shown in FIG. 6 to that shown in FIG. 8. It will be understood that if the transformer primary is moved further to the right from the position shown in FIG. 8, the phase displacement between adjacent bars of the transformer secondary will be still further reduced, while if it is moved to the left, the phase displacement will show a corresponding increase. Regarding each of the bars of the transformer secondary as an output, it will be seen that the arrangement provides a plurality of outputs in which the phase difference between the currents in the outputs is a function of the relative position of the primary and secondary windings. The arrangement is in fact a new type of transformer. The primary winding takes in a supply with a fixed number of phases (probably three), having a fixed relative phase displacement (probably 180 degrees) and the secondary yields a plurality of outputs of which the phase displacement between adjacent outputs is adjustable.

The above discussion has been concerned with the phase difference between the currents flowing in the bars forming the secondary winding. It will, however, be appreciated that the circumstances are the same if the bars are replaced by ring-wound coils such as shown in FIG. 4. Further if one short-circuiting ring is removed from the bars as shown in FIG. 3, the same considerations applied to the electromotive forces generated in the bars.

It was previously mentioned that the primary winding is the same as that shown in FIG. 2 and FIG. 19 shows diagrammatically the form of the winding. For simplicity only 10 slots have been shown and the simplest form of winding is illustrated, namely one having one slot per pole per phase. In addition the coils have been shown as comprising a single conductor but it will be understood that in general more than one conductor will be employed. The leads labelled, R, B and Y are connected to the corresponding phases of the supply and N is the neutral point.

It will be understood that either a part of the structure accommodating the primary winding or a part of the structure accommodating the secondary winding must be unwound in order, in the case of a cylindrical machine, to prevent one end of the secondary winding being influenced by coils of the primary winding of unsuitable pole pitch on relative movement between the primary and secondary windings. FIG. 7 shows the same arrangement as FIG. 6 with part of the primary winding omitted. The result will be that some of the bars of the secondary winding remain unenergised but the phase increment per bar over the energised part of the secondary winding will remain 18 degrees with the primary and secondary winding in the relative position shown in FIG. 7.

It will also be understood that in FIGS. 6 and 7 it has not been possible to show all the slots in either of the structures, the first 20 slots being shown in full and thereafter every 10th slot. The position of the 0, 180°, 300° . . . points are however shown with the corresponding slot number as in FIG. 2.

An important application of the invention is to the provision of a variable speed induction motor and this application is illustrated in FIG. 9 of the drawings. Referring to FIG. 9, this shows the transformer primary 20 and transformer secondary 21 which are the same as those of FIG. 7. In the arrangement of FIG. 9, however, connections 22 serve to connect the polyphase outputs from the secondary 21 to uniformly distributed bars 23 in a third slotted structure 24. This third structure has 80 uniformly separated slots numbered 10 to 89 and the bars in this structure are connected to the similarly numbered bars in the secondary. The bars in the third structure will therefore be supplied with currents whose phase increases progressively from left to right but in which the phase increment per bar is a function of the position of the transformer primary relative to the transformer secondary and changes as the transformer primary is moved to the position indicated by 28′. Some of the bars, of course, will not be energised due to the shortening of the primary. However, over the energised part of the third structure, a travelling field will be generated on the surface of the third block whose velocity is a function of the position of the transformer primary relative to the transformer secondary. If now a fourth structure 25 is added containing a squirrel cage winding and electrically coupled to the third structure 24, but free to move, this fourth structure will tend to travel at a speed equal to the speed of the field generated by the third structure.

It will be understood that FIG. 9 is derived from the developed diagrams of cylindrical structures and it follows that the original stator and rotor block now forming the transformer primary and secondary respectively can be closed together like a book and rolled up again. Similarly the third and fourth structures can be closed together like a second book, and rolled up to provide a second cylindrical structure interconnected with the first by the bars 22 which are common to the transformer secondary and the third structure. The assembly will then appear as in FIG. 10. Referring to this drawing, the transformer primary is shown at 30 and the transformer secondary at 31. The slots in the primary and secondary windings are logarithmically spaced and the bars which form the secondary winding are interconnected by bars 32 to the equally spaced bars provided in slots 33 on the motor stator 34. The rotor 35 of the machine surrounds the stator and will rotate at a speed depending on the setting of the transformer primary relative to the transformer secondary. It will be understood that either the primary or the secondary of the transformer arangement may be adjustable and the machine will be unconventional in that the rotating portion of the motor section is the outer portion. From the constructional point of view, the rotor 35 of the motor section could be secured to a circular plate of non-magnetic material having a central hollow shaft which would be supported in an overhung bearing, the shaft 36 of the stator extending through the hollow shaft. A similar arrangement could also be employed for the transformer section.

In an alternative arrangement shown in FIG. 11, the transformer primary could form the inner member of the transformer arrangement while the secondary could form the annular portion. The motor stator would then be the outer member of the motor section, giving a more practical form to the machine. Thus referring to FIG. 11, the transformer secondary 40 and the motor stator 41 are both mounted on a base plate 42. Also mounted on the base plate are bearings 43, 44 for the transformer primary 45 and bearings 46, 47 for the motor rotor 48. The operating handle 49 serves to adjust the position of the primary winding of the transformer relative to the secondary winding and the drive from the machine may be taken from the pulley 50.

A cross-sectional view through the slots of a machine constructed in a similar manner to that shown in FIG. 11 is shown in FIG. 16. The machine comprises a cylindrical housing 70 provided with end plates 71 and 72 each of which is provided with a centrally-disposed overhung bearing 73 and 74. The transformer primary consists of a number of sheet iron stampings 75 clamped by means of end plates 76, 77 on to a hub 78 provided on a shaft 79 carried by the overhung bearings 73. The motor rotor similarly consists of a number of stampings 80 clamped by means of end plates 81, 82 on to a hub 83 provided on a shaft 84 carried by the overhung bearing 74. The core structure of the transformer secondary and the motor stator also consist of stampings 85 and 86 respectively which are clamped between end plates 87, 88 and 89, 90 mounted on non-magnetic rods extending between the end plates 71 and 72, only two of the rods 91 being visible. The primary winding 92 of the transformer arrangement is indicated and the bars 93 forming the secondary winding, stator winding and interconnections therebetween are shown together with the short-circuiting rings 94 and 95. The drive is taken from the pulley 96.

It will, of course, be understood that the sections need not be rolled up to form cylindrical structures. If the books are closed then a linear transformer and a linear motor result. Alternatively the sections can be rolled up to form arcs of circles and combined with other similar sections to complete the circles. In particular, two such sections each occupying a semi-circle would provide a symmetrical assembly in which magnetic effects, such as the pull exercised between rotor and stator could be balanced. Such assemblies can also provide flux balance when fractional pole numbers are used, a fractional N pole on one section, for example, being matched by an equal fractional S pole on the other.

It will be understood that the invention has so far been described in terms of non-linear slotting of the primary and secondary forming the transformer section. Non-linear slotting is, however, not necessary provided there is an adequate number of slots. All that is required is that the distribution of the transformer windings should be in accordance with an approximately logarithmic pattern. Such a distribution may be obtained with uniformly displaced slots by using a winding plan which allocates a decreasing number of slots per pole as the winding proceeds from left to right. Such a winding plan is indicated in FIG. 12 of the drawings which shows how one phase of a wavewound undistributed winding could be accommodated in uniformly spaced slots.

An alternative and preferred winding plan, however, is shown in FIG. 17 and in this case the logarithmic distribution is obtained by mixing the phases of supply in the slots. The example shown in FIG. 17 is for an 8-pole primary winding having 54 equally spaced slots and gives a good approximation to the correct effective current in each slot while maintaining the same total number of turns for each coil. A total of 22 coils are provided and the circled references in the slots represent the coil numbers while the plain references indicate the number of conductors of the corresponding coil appearing in the slot. Thus the first coil has 32 turns and is energised from the R phase of the supply. This coil is located in the first and fourth slots beginning at the right hand side of the drawing. The 17th coil also has 32 turns and is energised from the B phase but the coil is divided between slots 22, 23 and 24 with 4, 18 and 10 turns respectively and between slots 28, 29 and 30 with 6, 10 and 16 turns respectively.

As regards the secondary winding using uniform slotting, each bar or ring-wound coil is not individually connected to a bar on the motor stator but some of the bars or coils are connected in series or omitted in order to provide the desired phase output pattern.

Further in the arrangement so far described the non-linear displacement of the windings are confined to the transformer section. However from a constructional point of view, this is not very convenient owing to the fact that the spacing of the slots becomes too small to be practical for winding purposes. Accordingly the non-linearity is divided between the secondary of the transformer and the stator section of the motor as shown in FIG 13. Referring to this drawing, the slots 10 to 70 of the transformer secondary 21 are logarithmically spaced while the slots from 70 onwards are evenly spaced. As regards the stator, slots 10 to 70 are equally spaced while the slots from 70 onwards are logarithmically spaced. Thus the logarithmic spacing of the slots is in opposite senses in the secondary and the stator. The non-linearity of the transformer primary will not then correspond with that of the secondary alone but with the combined non-linearity of the transformer secondary and the motor stator. With the arrangement described in which the transformer primary is shortened to allow for movement over the secondary surface, the resulting motor is energised over only a part of its periphery and the number of poles in this part is equal to the number of poles wound on the transformer primary. As the transformer primary is moved up and down the secondary, the number of poles on the motor stator remains constant but the arc which they occupy varies.

An alternative mechanical construction of the arrangement according to the invention is shown in FIG. 14. The centre member 60 is a squirrel cage rotor. The adjacent member 61 is annular with slots on the inner and outer cylindrical surfaces, the inner surface corresponding with the motor stator and the outer surface with the transformer secondary. These slots are inter-connected in a non-linear manner to provide the requisite logarithmic law. The outer member 62 carries the transformer primary winding logarithmically distributed to match the effects of the distribution on the transformer secondary and on the motor stator. Speed variation can be obtained either by rotating the outer member 62 relative to the annular member 61, or the annular member 61 relative to the outer member 62. In the latter case there are no external electrical connections of any kind to the part which is moved to adjust the speed and the forces on it are small. In the case where the annular member 61 is adjusted relative to the outer member 62, the latter could be mounted on a suitable base 63 while the annular member 61 would be mounted in an overhung bearing, the shaft 64 to which the rotor is secured also passing through this bearing and a further bearing at the other end of the machine.

The machine can of course be caused to run in either direction by appropriate connection of the phases, but the preferred direction is such that the primary field in the transformer section is travelling from the short pole pitch end towards the long pole pitch end. This is because when the machine is running light the flux piles up at this end of the structure and there is more iron per pole here to carry it.

A further application of the invention is to a pole-changing arrangement for varying the speed of an induction motor. It will be appreciated that in all the applications so far described, the transformer primary has carried a single set of windings. However, a second set of windings with a different number of poles can be wound in the same slots as the first set of windings, providing, for example, two poles for each pole of the first set. Alternatively, however, referring to FIG. 7, in which some of the windings were omitted to provide latitude for movement, the windings could in fact be left complete, as in FIG. 6, with provision for different sections to be brought into play at different times. For example, the windings could be supplied at the left hand end and a star point formed at the 540° point in FIG. 6. This arrangement would then operate as described in relation to FIGS. 7 and 8. Alternatively, the supply could be to the 180° point with the star point transferred to the right hand end of the windings in which case the primary of FIG. 7 can be moved from the position shown until the 20th slot is opposite the 10th slot on the secondary, so providing a further 2:1 change of speed. This process of moving the supply point progressively to the right in FIG. 6 can be continued to the point where there are too few poles left to the right of the supply point for satisfactory operation. To avoid this difficulty the windings can be extended beyond the right hand end of FIG. 6 into the left hand end of FIG. 6 as a second set of windings, it being remembered that in the cylindrical form the right-hand end of FIG. 6 is coincident with the left-hand end. In this way the sets of windings can theoretically proceed round and round the structure, with a multiplicity of supply and star points provided to cover different speed ranges. The process will, of course, eventually become impossible in practice due to the rapidly decreasing pole pitch of the winding. A simple arrangement of this type is shown in FIG. 18 where an 8-pole primary winding is shown together with two switches SW1 and SW2. The three phase supply leads are connected to switch SW1 while a star point is connected to switch SW2. With the switches in the position shown in the drawing, the supply is to the 0° point and the star connection to the 900° point while when both switches are operated, the supply is to the 360° point and the star connection to the 1440° point.

While the transformer section according to the invention has been described with reference to its phase changing function, it can be arranged to provide a variable ratio transformer. Thus referring to FIG. 15 this shows a set of windings such as FIG. 2 having a constant pole pitch along its length. It differs from FIG. 2, however, in that the number of turns in each slot as indicated by the top row of numbers increases logarithmically from left to right so that although the phase proceeds uniformly from left to right the number of turns increases non-uniformly from left to right as indicated by the column showing the number of turns. If this winding is coupled to a similar winding as shown in the lower part of the drawing, then the structure forms a polyphase transformer having a ratio of 1:1. It can conveniently have the same number of phases in the secondary as the primary, but this is not necessary. If now the upper structure is displaced relative to the lower structure so as to align the slot with 10 turns against the slot with 20 turns, it may be seen that the slot with 20 turns faces the slot with 40, the slot with 30 turns faces the slot with 60 turns, and so on. Thus, there is voltage step-up of 2:1 provided in this position. If an equal displacement in the other sense is made between the blocks, then a 2:1 ratio in the opposite sense is provided. Intermediate ratios are obtained with intermediate settings and greater displacement in either direction will result in greater ratios.

A transformer arrangement of this nature may be employed, according to the invention, in conjunction with the variable speed motor described, for instance, with reference to FIG. 9. Thus if the transformer secondary consists of a ring winding such as shown in FIG. 5, and is employed in conjunction with a logarithmically distributed primary, it will be understood that if the primary winding is logarithmically distributed both in pole pitch and in number of turns, and if the ring winding secondary is similarly logarithmically distributed in both spacing and number of turns, then a transformer is obtained, according to the invention, which provides not only a supply with a variable number of phases, but also with a variable ratio. The logarithmic distributions of turns and pole pitch do not need to be on the same scaling nor need they "contract" in the same direction. This may be of advantage in matching the operating voltage of a variable speed machine of the type described to fixed voltage supply mains. With this arrangement it would not be possible to use simple bars in the stator of the motor section of the machine, but these can be replaced by ring windings in the same way as the ring windings of FIG. 5 replace the bars of FIG. 3. If the machine is built in this way using ring windings whether with variable numbers of turns or not, rather than bars, then the transformer section may be remote from the motor section and connected to it by a multi-core cable.

In all the drawings the slots in the primary core have been shown as being parallel to those in the secondary core. However, in a practical machine it is probable that a slight skew will be introduced between the slots in the two cores. This skewing of the slots represents a compromise in order to obtain reasonable constancy of efficiency at all positions of the primary winding with respect to the secondary winding.

It will also be understood that while the description has been concerned with an induction machine which provides a mechanical drive when a polyphase supply is connected to it, the machine may equally well be employed as an induction generator. In this case, a polyphase supply will be connected to the primary winding of the transformer section to provide the magnetising current in the usual way and the rotor will be mechanically driven.

I claim:

1. A polyphase transformer arrangement comprising a first slotted core structure, a logarithmically distributed primary winding accommodated on said first slotted core structure and energised from a polyphase supply, a second slotted core structure, a logarithmically distributed secondary winding accommodated on said second slotted core structure and electromagnetically coupled to said primary winding, a plurality of outputs connected to said secondary winding and means for adjusting the relative position between the said first and second core structures.

2. A polyphase transformer arrangement comprising a first slotted core structure, a primary winding accommodated on said first slotted core structure and energised from a polyphase supply, said primary winding being so arranged that the phase of the effective current in the conductors of any slot is a logarithmic function of the distance of said slot from a first slot, a second slotted core structure, a secondary winding logarithmically distributed on said second slotted core structure and electromagnetically coupled to said primary winding, a plurality of outputs connected to said secondary winding and means for adjusting the relative position between said first and second core structures to enable the phase difference between adjacent outputs to be adjusted in the same ratio.

3. A polyphase transformer arrangement comprising a first slotted core structure, a primary winding accommodated on said first slotted core structure and energised from a polyphase supply, the number of conductors in any one slot being a logarithmic function of the distance of said slot from a first slot, a second slotted core structure, a secondary winding accommodated on said second slotted core structure and electromagnetically coupled to said primary winding, the number of conductors in any one slot being a logarithmic function of the distance of said slot from a first slot, a plurality of outputs connected to said secondary winding and means for adjusting the relative position between said first and second core structures to enable a variable ratio to be obtained between the voltage of the outputs of said secondary winding and the voltage of said polyphase supply.

4. A polyphase transformer arrangement comprising a first slotted core structure, the spacing between the slots being a logarithmic function of the slot member, a primary winding accommodated on said first slotted core structure and energised from a polyphase supply, the number of conductors in each slot of said first slotted core structure being the same, a second slotted core structure, the spacing between the slots being a logarithmic function of the slot number, a secondary winding accommodated on said second slotted core structure and electromagnetically coupled to said primary winding, the number of conductors in each slot of said second slotted core structure being the same a plurality of outputs connected to said secondary winding and means for adjusting the relative position between said first and second core structures to enable the phase difference between adjacent outputs to be continuously adjusted.

5. A polyphase transformer arrangement comprising a first slotted core structure having uniformly spaced slots, a primary winding accommodated in said uniformly spaced slots and arranged so that the phase of the effective current flowing in the conductors of any slot of said primary winding is a logarithmic function of the distance of that slot from a first slot by including within certain of the slots a combination of conductors connected to more than one phase of said polyphase supply, a second slotted core structure having uniformly spaced slots, a secondary winding logarithmically distributed in said uniformly spaced slots and electromagnetically coupled to said primary winding, said secondary winding consisting of a plurality of bars, the bars being connected at one of their ends to a short-circuiting ring, a plurality of outputs for said secondary winding, each output being connected to the other end of at least one bar and means for adjusting the relative position between said first and second core structures.

6. A polyphase transformer arrangement comprising a first slotted core structure having uniformly spaced slots, a primary winding accommodated in said uniformly spaced slots and so arranged that the phase of the effective current flowing in the conductors of any slot of said primary winding is a logarithmic function of the distance of that slot from a first slot by including within certain of the slots a combination of conductors connected to more than one phase of said polyphase supply, a secondary winding logarithmically distributed in said uniformly spaced slots and electromagnetically coupled to said primary winding, said secondary winding consisting of a plurality of ring-wound coils, one end of all said coils being connected together, a plurality of outputs for said secondary winding, each output being connected to the other end of at least one coil and means for adjusting the relative positions between said first and second core structures.

References Cited in the file of this patent

UNITED STATES PATENTS 2,466,690    Curry _____ Apr. 12, 1949